(12) United States Patent
Wygodny et al.

(10) Patent No.: US 7,827,539 B1
(45) Date of Patent: Nov. 2, 2010

(54) SYSTEM AND METHOD FOR AUTOMATED TUNING OF PROGRAM EXECUTION TRACING

(75) Inventors: Shlomo Wygodny, Ramat Hasharon (IL); David Elkind, Rehovot (IL); Moshe Kravchik, Beit Shemesh (IL)

(73) Assignee: Identify Software Ltd. (IL)

( * ) Notice: Subject to any disclaimer, the term of this patent is extended or adjusted under 35 U.S.C. 154(b) by 1166 days.

(21) Appl. No.: 11/165,442

(22) Filed: Jun. 23, 2005

Related U.S. Application Data

(60) Provisional application No. 60/582,761, filed on Jun. 25, 2004.

(51) Int. Cl.
 *G06F 9/44* (2006.01)
(52) U.S. Cl. .................. 717/128; 717/130; 717/131
(58) Field of Classification Search .................. 717/128
 See application file for complete search history.

(56) References Cited

U.S. PATENT DOCUMENTS

| | | | |
|---|---|---|---|
| 4,503,495 A | 3/1985 | Boudreau | |
| 4,511,960 A | 4/1985 | Boudreau | |
| 4,598,364 A | 7/1986 | Gum et al. | |
| 4,782,461 A | 11/1988 | Mick et al. | |
| 4,879,646 A | 11/1989 | Iwasaki et al. | |
| 5,021,949 A | 6/1991 | Morten et al. | |
| 5,121,489 A | 6/1992 | Andrews | |
| 5,193,180 A | 3/1993 | Hastings | |
| 5,265,254 A | 11/1993 | Blasiak et al. | |
| 5,297,274 A | 3/1994 | Jackson | |
| 5,335,344 A | 8/1994 | Hastings | |
| 5,347,649 A | 9/1994 | Alderson | |
| 5,386,522 A | 1/1995 | Evans | |
| 5,386,565 A | 1/1995 | Tanaka et al. | |
| 5,394,544 A | 2/1995 | Motoyama et al. | |
| 5,408,650 A | 4/1995 | Arsenault | |
| 5,410,685 A | 4/1995 | Banda et al. | |
| 5,421,009 A | 5/1995 | Platt | |
| 5,446,876 A | 8/1995 | Levine et al. | |
| 5,450,586 A | 9/1995 | Kuzara et al. | |
| 5,465,258 A | 11/1995 | Adams | |

(Continued)

OTHER PUBLICATIONS

An Adaptive Cost System for Parallel Program Instrumentation Jeffrey K. Hollingsworth and Barton P. Miller Proceedings of the Second International Euro-Par Conference on Parallel Processing—vol. I 1996, pp. 88-97.*

(Continued)

*Primary Examiner*—Lewis A Bullock, Jr.
*Assistant Examiner*—Paul Mills
(74) *Attorney, Agent, or Firm*—Knobbe, Martens, Olson & Bear, LLP

(57) ABSTRACT

A tracing system that provides automated tuning of execution tracing by adjusting the collection of trace data is described. In one embodiment, the user sets an initial tracing profile for a tracing program. In addition, the user sets an upper limit for the tracing performance penalty. The auto-tuning system monitors the performance penalty induced by tracing and, when the performance impact is excessive, removes trace points that are causing the most impact on performance. Auto tuning is especially useful for performing software recording in mission-critical and/or time-critical applications, such as servers, real-time applications, etc. The system typically adjusts relatively quickly such that most users do not feel the influence of the tracer.

25 Claims, 7 Drawing Sheets

U.S. PATENT DOCUMENTS

| | | | |
|---|---|---|---|
| 5,481,740 | A | 1/1996 | Kodosky |
| 5,483,468 | A | 1/1996 | Chen et al. |
| 5,513,317 | A | 4/1996 | Borchardt et al. |
| 5,526,485 | A | 6/1996 | Brodsky |
| 5,533,192 | A | 7/1996 | Hawley et al. |
| 5,551,037 | A | 8/1996 | Fowler et al. |
| 5,574,897 | A * | 11/1996 | Hermsmeier et al. ........... 707/1 |
| 5,581,697 | A | 12/1996 | Gramlich et al. |
| 5,590,354 | A | 12/1996 | Klapproth et al. |
| 5,612,898 | A | 3/1997 | Huckins |
| 5,615,331 | A | 3/1997 | Toorians et al. |
| 5,632,032 | A | 5/1997 | Ault et al. |
| 5,642,478 | A | 6/1997 | Chen et al. |
| 5,657,438 | A | 8/1997 | Wygodny et al. |
| 5,732,210 | A | 3/1998 | Buzbee |
| 5,740,355 | A | 4/1998 | Watanabe et al. |
| 5,745,748 | A | 4/1998 | Ahmad et al. |
| 5,771,385 | A | 6/1998 | Harper |
| 5,781,720 | A | 7/1998 | Parker et al. |
| 5,848,274 | A | 12/1998 | Hamby et al. |
| 5,867,643 | A | 2/1999 | Sutton |
| 5,870,606 | A | 2/1999 | Lindsey |
| 5,896,535 | A | 4/1999 | Ronstrom |
| 5,903,718 | A | 5/1999 | Marik |
| 5,928,369 | A | 7/1999 | Keyser et al. |
| 5,938,778 | A | 8/1999 | John, Jr. et al. |
| 5,940,618 | A | 8/1999 | Blandy et al. |
| 5,960,198 | A * | 9/1999 | Roediger et al. ............ 717/130 |
| 5,983,366 | A | 11/1999 | King |
| 6,003,143 | A | 12/1999 | Kim et al. |
| 6,026,433 | A | 2/2000 | D'Arlach et al. |
| 6,026,438 | A | 2/2000 | Piazza et al. |
| 6,047,124 | A | 4/2000 | Marsland |
| 6,065,043 | A | 5/2000 | Domenikos et al. |
| 6,108,330 | A | 8/2000 | Bhatia et al. |
| 6,202,199 | B1 | 3/2001 | Wygodny et al. |
| 6,219,826 | B1 | 4/2001 | De Pauw et al. |
| 6,237,138 | B1 | 5/2001 | Hameluck et al. |
| 6,263,456 | B1 | 7/2001 | Boxall et al. |
| 6,282,701 | B1 | 8/2001 | Wygodny et al. |
| 6,321,375 | B1 | 11/2001 | Blandy |
| 6,360,331 | B2 | 3/2002 | Vert et al. |
| 6,374,369 | B1 | 4/2002 | O'Donnell |
| 6,415,394 | B1 | 7/2002 | Fruehling et al. |
| 6,467,052 | B1 | 10/2002 | Kaler et al. |
| 6,490,696 | B1 | 12/2002 | Wood et al. |
| 6,507,805 | B1 * | 1/2003 | Gordon et al. .............. 702/186 |
| 6,634,001 | B2 | 10/2003 | Anderson et al. |
| 6,865,508 | B2 | 3/2005 | Ueki et al. |
| 7,058,928 | B2 | 6/2006 | Wygodny et al. |
| 7,089,536 | B2 | 8/2006 | Ueki et al. |
| 7,114,150 | B2 * | 9/2006 | Dimpsey et al. ............ 717/131 |
| 7,386,839 | B1 | 6/2008 | Golender et al. |
| 2002/0087949 | A1 | 7/2002 | Golender et al. |
| 2003/0005414 | A1 | 1/2003 | Elliott et al. |
| 2004/0060043 | A1 * | 3/2004 | Frysinger et al. ............ 717/158 |
| 2006/0150162 | A1 * | 7/2006 | Mongkolsmai et al. ..... 717/131 |
| 2006/0242627 | A1 | 10/2006 | Wygodny et al. |
| 2008/0244534 | A1 | 10/2008 | Golender et al. |

OTHER PUBLICATIONS

Java for On-line Distributed Monitoring of Heterogeneous Systems and Services Paolo Bellavista, Antonio Corradi and Cesare Stefanelli The Computer Journal, vol. 45, No. 6, 2002.*

DynTG: A Tool for Interactive, Dynamic Instrumentation Martin Schulz, John May, and John Gyllenhaal ICCS 2005, LNCS 3515, pp. 140-148, 2005.*

An Overview of the Pablo Performance Analysis Environment Daniel Reed et al. University of Illinois Department of Computer Science Nov. 1992.*

Phoenix: A Self Adaptable Monitoring Platform for Cluster Management Céline Boutros Saab, Xavier Bonnaire and Bertil Folliot Cluster Computing 5, 75-85, 2002.*

Falcon: On-line monitoring and Steering of Large-Scale Parallel Programs Weiming Gu, Greg Eisenhauer, Eileen Kraemer, Karsten Schwan, John Stasko, and Jeffrey Vetter Proceedings of the Fifth Symposium on the Frontiers of Massively Parallel Computation 1995.*

Abramson, D., et al., "A Debugging Tool for Software Evolution", Case-95, 7th International Workshop on Computer-Aided Software Engineering, Jul. 1995.

Appelbe et al., "Integrating tools for debugging and developing multitasking programs," ACM, 1993, pp. 78-88.

Bates, Peter C., "Debugging Heterogeneous Distributed Systems Using Event-Based Models of Behavior," ACM Transactions on Computer Systems, vol. 13, No. 1, Feb. 1995, pp. 1-31.

Bruegge, C.P. et al., "A Framework for Dynamic Program Analyzers," OOPSLA, 1993, pp. 62-85.

Forrest, S., et al., "A sense of self for Unix processes," Proceedings of 1996 IEEE Symposium on Computer Security and Privacy, 1996, pp. 120-128.

Geer, C.P. et al., "Instruction Stream Trace," IBM Technical Disclosure Bulletin, vol. 26, No. 11, Apr. 1984, pp. 6217-6220.

Goldszmidt et al, "Interactive blackbox debugging for concurrent language", ACM pp. 271-282, 1990.

Harward, L.D. Jr., "PL/1 Trace Program," IBM Technical Disclosure Bulletin, vol. 13, No. 4, Sep. 1970, pp. 855-857.

Hunt, T.A., "General Trace Facility," IBM Technical Disclosure Bulletin, vol. 15, No. 8, Jan. 1973, pp. 2446-2448.

Larus, James R., "Efficient Program Tracing," IEEE, May 1993, pp. 52-61.

Malony, Allen D. et al., "Traceview: A Trace Visualization Tool," IEEE, Sep. 1991, pp. 19-28.

Martonosi, Margaret et al., "Effectiveness of Trace Sampling for Performance Debugging Tools," ACM SIGMETRICS, 1993, pp. 248-259.

Meier, Michael S., et al., "Experiences with Building Distributed Debuggers," SPDT, 1996, pp. 70-79.

Mukherjea, Sougata et al., "Applying Algorithm Animation Techniques for Program Tracing, Debugging, and Understanding," IEEE, 1993, pp. 456-465.

Netzer, Robert H.B., "Optimal Tracing and Replay for Debugging Shared-Memory Parallel Programs," ACM/ONR Workshop on Parallel and Distributed Debugging, May 17-18, 1993, San Diego, California, pp. 1-12.

Netzer, Robert H.B. et al., "Optimal Tracing and Replay for Debugging Message-Passing Parallel Programs," IEEE, 1992, pp. 502-511.

Netzer, H.B., et al., "Optimal Tracing and Incremental Reexecution for Debugging Long-Running Programs," ACM SIGPLAN 1994 Conference on Programming Language Design and Implementation, Jun. 20-24, Orlando, Florida, pp. 313-325.

Plattner, Bernhard et al., "Monitoring Program Execution: A Survey," IEEE, Nov. 1981, pp. 76-93.

Redell, "Experience with Topaz teledebugging", ACM SIGPLAN & SIGOPS, pp. 35-44, 1990.

Reiss, Steven P., "Trace-Based Debugging," Automated and Algorithmic Debugging Workshop, May 3-5, 1993.

Rosenberg, Jonathan B., How Debuggers Work: Algorithms, Data Structures, and Architecture, John Wiley & Sons, Inc., 1996.

Schieber, Colleen et al., "Ratchet: Real-time Address Trace Compression Hardware for Extended Traces," Performance Evaluation Review, vol. 21, Nos. 3 and 4, Apr. 1994, pp. 22-32.

Soule, K., "Algorithm for Tracing Execution Paths to a Given Location in a Program," IBM Technical Disclosure Bulletin, vol. 14, No. 4, Sep. 1971, pp. 1016-1019.

Spinellis, Diomidis, "Trace: A Tool for Logging Operating System Call Transactions," Operating Systems Review Publication, vol. 28, No. 4, Oct. 1994, pp. 56-63.

Timmerman, F Gielen et al., "High Level Tools for the Debugging of Real-Time Multiprocessor Systems," ACM/ONR Workshop on Parallel and Distributed Debugging, May 17-18, 1993, San Diego, California, pp. 151-158.

Tsai, Jeffrey J.P. et al., "A Noninvasive Architecture to Monitor Real-Time Distributed Systems," IEEE, Mar. 1990, pp. 11-23.

Ueki, K., et al., "A Probe Debugging Method", Technical Report of Ieice, Jul. 2000.

Wilner, David, "WindView: A Tool for Understanding Real-time Embedded Software through System Visualization,", ACM SIGPLAN Notices, vol. 30, No. 11, Nov. 1995, pp. 117-123.

Wismuller, "Debugging of globally optimized programs using data flow analysis", ACM SIGPLAN, Apr. 1994, pp. 278-289.

Lee et al., "Learning Patterns from Unix Process Execution Traces for Intrusion Detection," AAAI Technical Report 1997 (retrieved on Jun. 11, 2009) Retrieved from the Internet: URL: https://www.aaai.org/Papers/Workshops/1997/WA-97-07/WS97-07-010.pdf.

Office Action dated Feb. 10, 2000 from Related U.S. Appl. No. 09/126,120.

Notice of Allowance dated Sep. 11, 2000 from Related U.S. Appl. No. 09/126,120.

Office Action dated Jan. 14, 2000 from Related U.S. Appl. No. 09/126,126.

Notice of Allowance dated Sep. 11, 2000 from Related U.S. Appl. No. 09/126,126.

Supplemental Notice of Allowance dated Mar. 16, 2001 from Related U.S. Appl. No. 09/126,126.

Office Action dated Mar. 1, 2005 from Related U.S. Appl. No. 10/057,002.

Office Action dated Aug. 25, 2005 from Related U.S. Appl. No. 10/057,002.

Notice of Allowance dated Feb. 28, 2006 from Related U.S. Appl. No. 10/057,002.

Office Action dated Apr. 11, 2004 from Related U.S. Appl. No. 09/799,338.

Office Action dated Jun. 6, 2005 from Related U.S. Appl. No. 09/799,338.

Advisory Action dated Oct. 7, 2005 from Related U.S. Appl. No. 09/799,338.

Office Action dated Jan. 23, 2006 from Related U.S. Appl. No. 09/799,338.

Office Action dated Sep. 1, 2006 from Related U.S. Appl. No. 09/799,338.

Office Action dated Jan. 9, 2007 from Related U.S. Appl. No. 09/799,338.

Office Action dated Sep. 27, 2007 from Related U.S. Appl No. 09/799,338.

Office Action dated Jun. 29, 2007 from Related U.S. Appl. No. 10/703,098.

Notice of Allowance dated Feb. 6, 2008 from Related U.S. Appl. No. 10/703,098.

Office Action dated Dec. 31, 2007 from Related U.S. Appl. No. 10/808,760.

Office Action dated Aug. 6, 2008 from Related U.S. Appl. No. 10/808,760.

Advisory Action dated Oct. 20, 2008 from Related U.S. Appl. No. 10/808,760.

Office Action dated Jan. 2, 2009 from Related U.S. Appl. No. 10/808,760.

Office Action dated Jun. 22, 2009 from Related U.S. Appl. No. 10/808,760.

* cited by examiner

SYSTEM AND METHOD FOR AUTOMATED TUNING OF PROGRAM EXECUTION TRACING

REFERENCE TO RELATED APPLICATION

The present application claims priority benefit of U.S. Provisional Application No. 60/582,761, titled "SYSTEM AND METHOD FOR AUTOMATED TUNING OF PROGRAM EXECUTION TRACING," filed Jun. 25, 2004, the entire contents of which is hereby incorporated by reference.

BACKGROUND

1. Field of the Invention

The invention relates to maintenance and debugging of computer software by execution tracing.

2. Description of the Related Art

Program execution tracing has become a valuable tool for troubleshooting run-time software problems and for remote application support. One of the major problems with this approach is keeping the right balance between completeness of the trace information and the performance penalty of the tracing process. Users of such a tool want to gather enough information to allow them to diagnose the problem. However, tracing of each function call, source line, variable and other run-time information can create an undesirable performance impact on the traced program. Extensive tracing can lead to situations where the traced process is slowed below acceptable levels. In real-life deployment scenarios, it is typically desirable to keep performance penalty within a 5-25% range.

SUMMARY

These and other problems are solved by a tracing system that provides automated tuning of execution tracing by adjusting the collection of trace data. In one embodiment, the tuning system can adjust the collection of trace data without the need for program sources or symbolic information, and hence, makes such automated tuning of program execution tracing possible in production environments.

In one embodiment, the user sets an initial tracing profile for a tracing program (tracer) that allows the user to gather a superset of information relevant for software problem troubleshooting. In addition, the user sets an upper limit for the tracing performance penalty. The auto-tuning system monitors the performance penalty induced by the tracer and, when the performance impact is excessive, removes trace points that are causing the most impact on performance. Using the described auto-tuning mechanism, the application operator can limit the performance penalty when access to the application sources and symbolic information is not available. Auto tuning is especially useful for performing software recording in mission-critical and/or time-critical applications, such as servers, real-time applications, etc. The system typically adjusts itself quickly enough (e.g., often in less than a second) and most users do not feel the influence of the tracer.

The auto-tuning process maintains a desired allowable performance penalty by adjusting the trace process to operate within preset limits. This is achieved by automatic adjustment of the trace points in the traced process. In one embodiment, tracing starts with a relatively maximal set of trace points that involves, for example, a list of functions of the traced process or methods of the debugged class. The auto-tuning module checks the performance penalty caused by tracing and turns off those trace points with the highest performance impact until the performance penalty drops below a specified limit.

In one embodiment, the auto-tuning process adapts to a variable CPU load. If the auto tuner system detects that the performance penalty is lower than the preset threshold, it turns on disabled trace points until the trace performance penalty reaches the threshold value.

In one embodiment, the user can mark certain trace points as obligatory for tracing and the auto-tuning procedure will not turn off these trace points.

In one embodiment, the auto-tuning system maintains a desired balance between trace completeness and trace performance penalty. In one embodiment, the system simplifies the trace point setting process and makes the trace-based troubleshooting process more user-friendly.

In one embodiment, the performance impact is specified in terms of program runtime. In one embodiment, the performance impact is specified in terms of CPU utilization. In one embodiment, the performance impact is specified in terms of system throughput. In one embodiment, the performance impact is specified in terms of an amount of time used by the tracing program. In one embodiment, the performance impact is specified in terms of an amount of time penalty caused by tracing.

One embodiment includes specifying an initial trace profile listing a first list of runtime events to be traced, monitoring a performance penalty incurred by tracing execution of a program using the first list of runtime events, determining which of the runtime events produces a relatively larger impact on the performance penalty to produce a second list of one or more runtime events, and removing the second list of events from the first list of events. In one embodiment, the monitoring, determining, and removing are repeated until the performance penalty falls below a desired level. In one embodiment, trace items are returned to the list of runtime events to be traced until the performance penalty approximates a desired level. In one embodiment, the performance criteria includes time taken by a tracing engine compared to time taken by a program being traced. In one embodiment, the list of runtime events is specified without recourse to compiler-generated debug information from the program. In one embodiment, the list of runtime events is specified without recourse to source code from the program. In one embodiment, the list of runtime events is specified using at least a portion of compiler-generated debug information from the program. In one embodiment, the list of runtime events is specified using at least a portion of the source code from the program.

DETAILED DESCRIPTION

Figure 1:
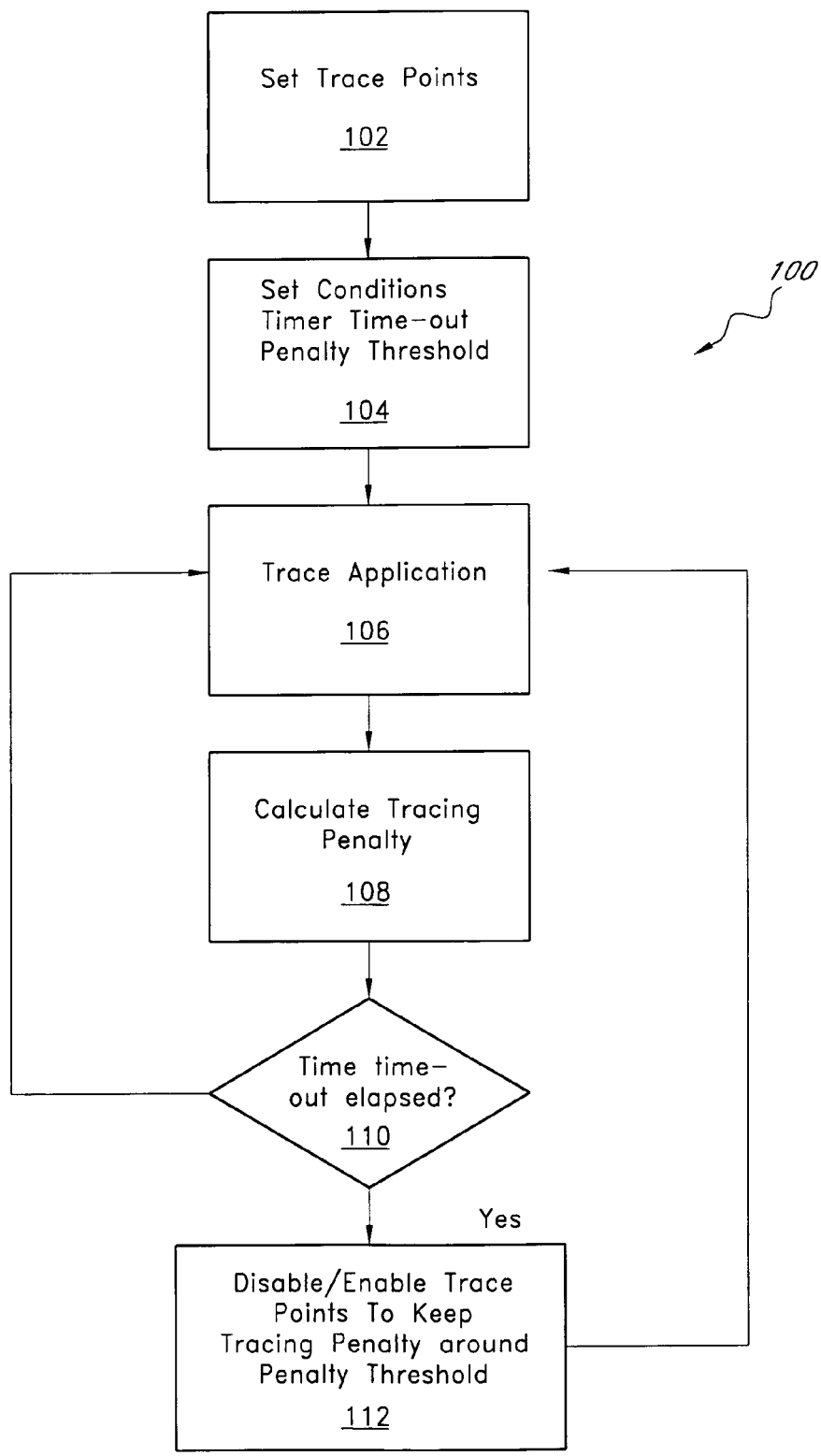
FIG. 1 is a block diagram of an auto-tuning tracing process.

FIG. 1 is a block diagram of an auto-tuning process 100. The process begins by specifying an initial collection of trace points 102. The initial collection can be specified by the user, set automatically, etc. In addition, two system-level parameters are set. These parameters include a timer time-out value and a penalty threshold 104. The timer time-out is a parameter that defines a time interval for checking the performance penalty. In one embodiment, the timer timeout is set at approximately 1 second. In other embodiments, it can be any number defined by a user or by the system. The penalty threshold is a user-defined parameter that specifies the maximum allowable performance penalty caused by tracing. Application execution tracing 106 traces the execution according to the defined collection of trace points. Execution tracing is described, for example, in U.S. Pat. No. 6,202,199 and U.S. Published Application 20020087949 (the entire contents of both are hereby incorporated by reference), or other tracing tools.

A performance module 108 calculates the tracing performance penalty. At time intervals, when the timer timeout has elapsed, the system adjusts the list of trace points 112 in such a way that the performance penalty stays relatively close to the penalty threshold.

In typical real-world cases, the auto-tuning reduces the performance penalty without substantial loss of significant information because the functions that are called relatively more often (and hence, consume a large recording penalty) are typically low-level functions, such as string manipulators, mouse movement handlers, etc. These functions are usually well debugged and, therefore, are not usually interesting for troubleshooting purposes. Thus, the removal of such functions from the trace list typically does not have a substantial impact on the value of the trace data.

In one embodiment, the following procedure is used for the calculation of the performance penalty.

Calculate an instrumentation time (InstrumentationTime) spent by the tracing engine. The value InstrumentationTime is calculated by summing time differences between entries and exits of the instrumentation engine for a specified interval of time called the TimeInterval.

Calculate the processor time used by the instrumented process (InstrumentedProcessTime). In one embodiment, the value InstrumentedProcessTime is calculated by using a performance counter (such as, for example, PercentProcessorTime on the Windows operating system) for the traced process. In order to take into account fluctuations in the CPU load, the counter values are averaged over the TimeInterval period of time. Time spent by the process is then calculated as InstrumentedProcessTime=TimeInterval*PercentProcessorTime/100.

In one embodiment, an upper level estimate is based on the assumption that the instrumented process uses all of the CPU resources: InstrumentedProcessTime=TimeInterval.

Calculate the CPU time used by the process, without the instrumentation overhead:

ProcessTime=InstrumentedProcessTime−InstrumentationTime.

Calculate performance penalty of the instrumentation:

Penalty=100*InstrumentaionTime/ProcessTime

In one embodiment, the system displays the current recording penalty, and/or the penalty over time, e.g. in a graph, table, display, etc. This can be used to determine the maximum penalty level for the auto-tuning mechanism.

Figure 2:
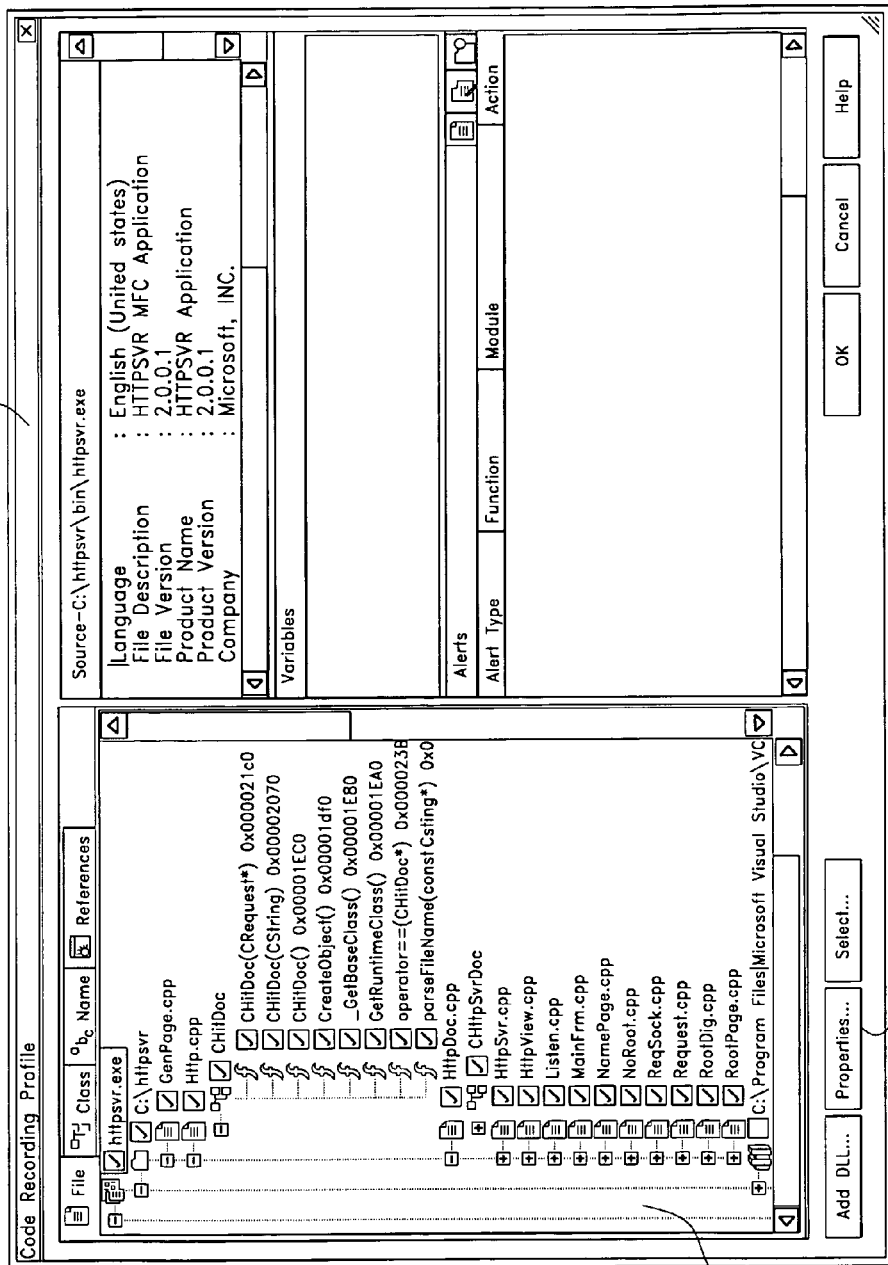
FIG. 2 shows a code recording profile dialog.

A typical workflow of the tracing system starts with the setting of the tracing or recording profile. A recording profile represents a collection of trace points that are inserted into the traced program. Each trace point is associated with a specific function or a source code line. The recording profile allows the trace user to set what will be recorded during tracing, such as function arguments and return values, local and global variables or calls to library functions, etc. FIG. 2 shows the code recording profile window of a sample application httpsrv.exe representing a simple HTTP server provided by Microsoft on MSDN. The user selects functions to be traced by marking checkboxes of corresponding function names in the left pane 202. In one embodiment, the tracer automatically turns on tracing of all source code functions of the traced process. In many situations this leads to a substantial performance penalty.

Figure 3:
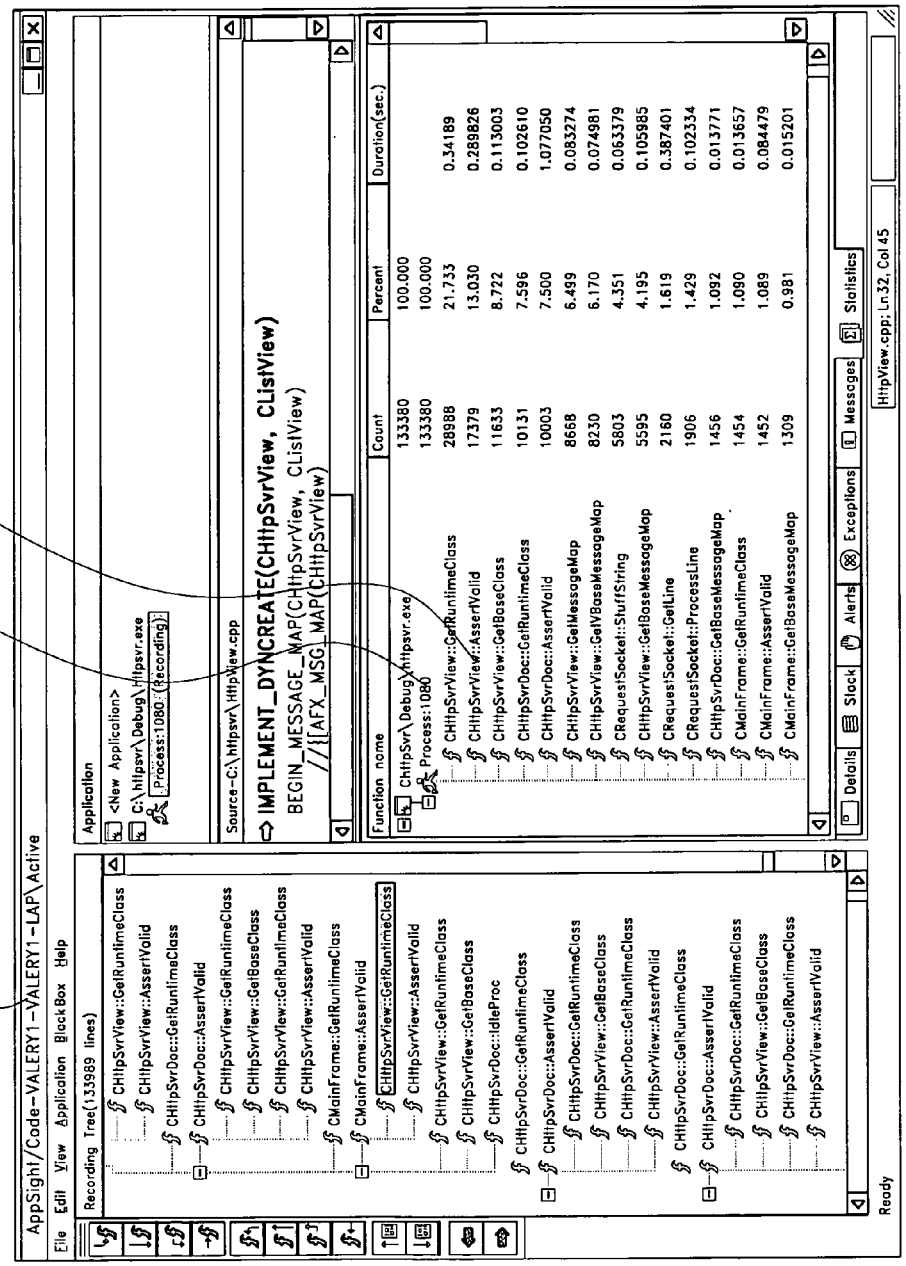
FIG. 3 shows an initial tracing view.

The results of the initial tracing are shown in FIG. 3, which shows the traced function call tree in a left pane and the statistics of the traced functions in a lower-right pane. By way of example, FIG. 3 shows are several functions that are called very often in one sample application. The Function CHttpSrvView:GetRunTimeClass 302 is called 28,988 times and the function CHttpSrvView:AssertValid 304 is called 17,379 times.

Figure 4:
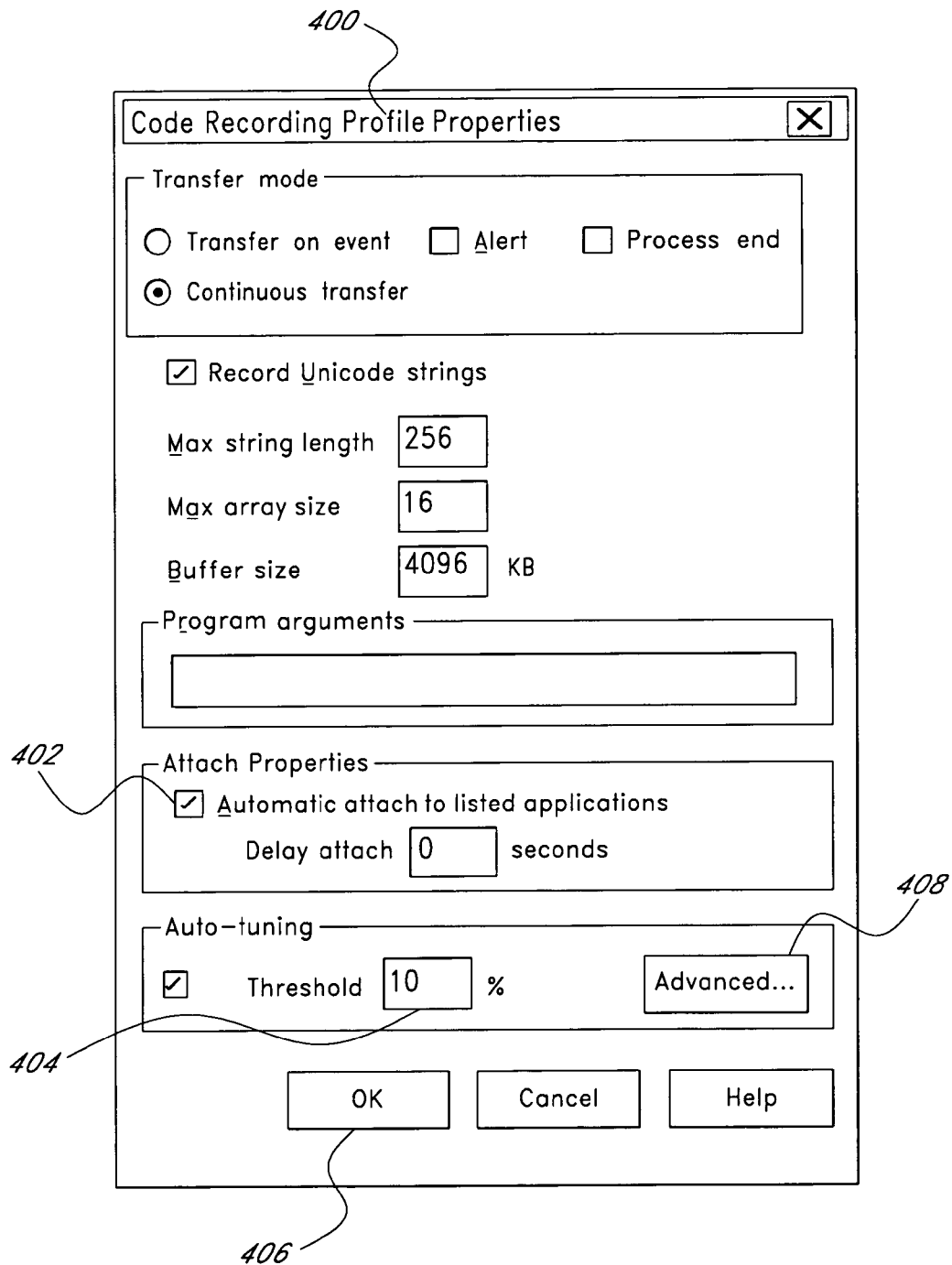
FIG. 4 shows a code recording profile properties dialog.
Figure 5:
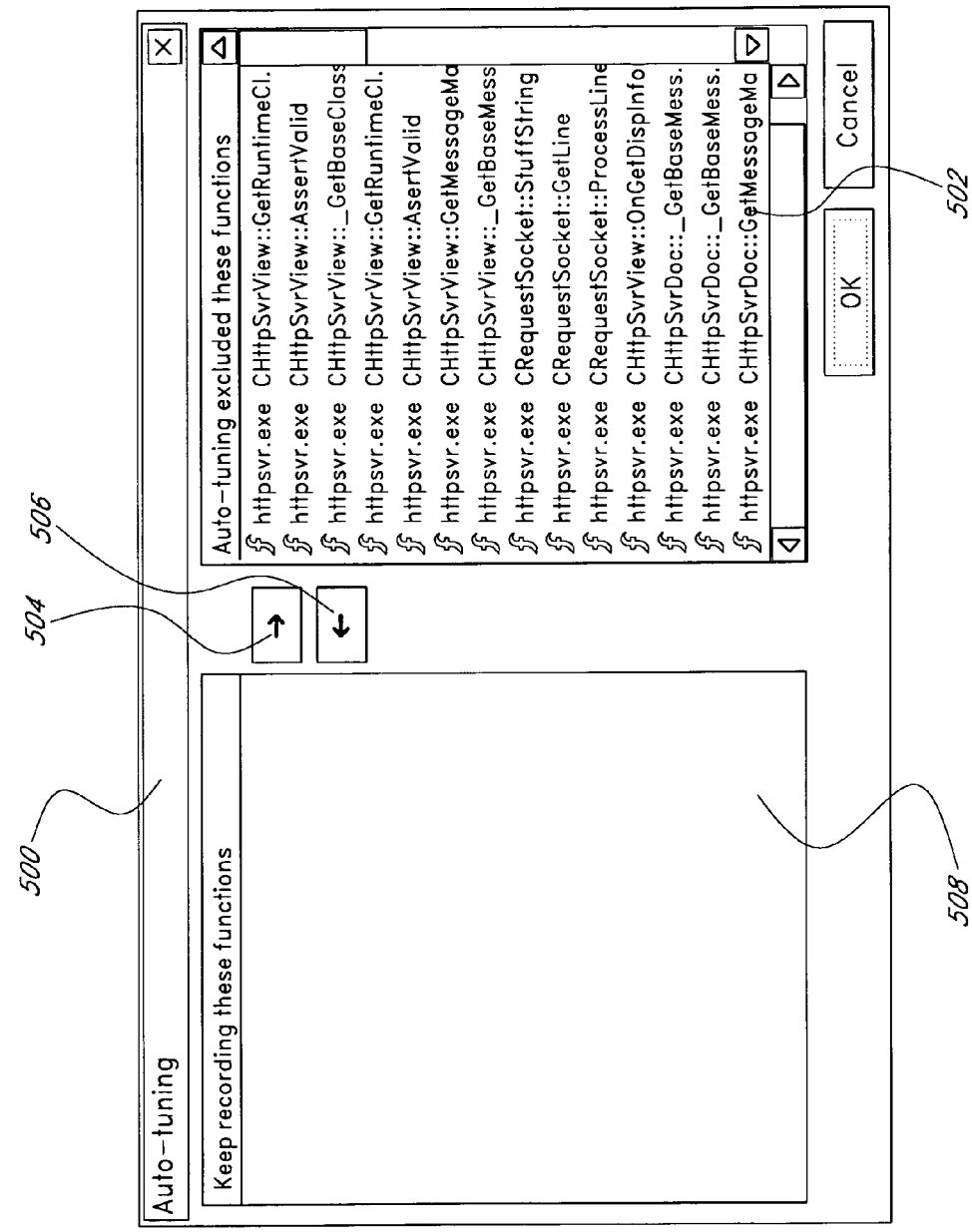
FIG. 5 shows an auto-tuning dialog with a list of excluded functions.

In order to limit the performance penalty, the user selects the Properties dialog by pressing the Properties button 204 as illustrated in FIG. 2. This action opens the Properties dialog presented in FIG. 4. The user selects an Auto-tuning check box 402 and enters a performance penalty value 404 expressed in percents. Clicking an OK button 406 applies the settings. Pressing an "Advanced" button 408 opens an Auto-tuning dialog 500 shown in FIG. 5.

The Auto-tuning dialog 500 has two panes. A right pane 502 shows the list of functions excluded from tracing by the auto-tuning process. The user can force a desired function to stay in the trace list by selecting the desired function in the right pane and pressing the left arrow button 504. The list of functions that are to be retained in the trace appears in the left window. These functions are a part of the recording profile. The user can move functions back to the removed list using the right arrow button 506. The list of functions deleted by the auto-tuning procedure 502 closely corresponds to the list of the most-frequently executed functions that are displayed in the right lower pane 304 in FIG. 3.

Figure 6:
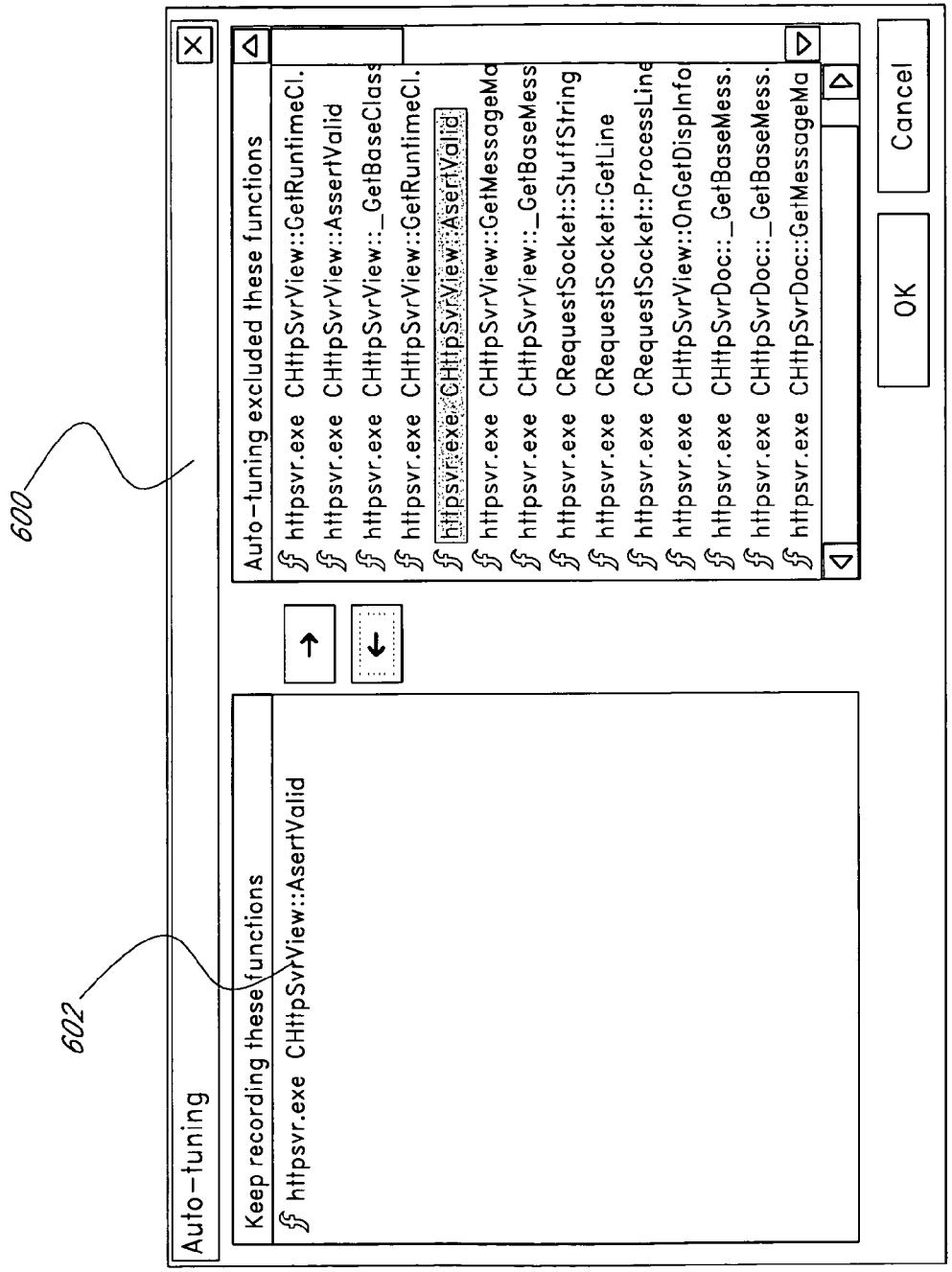
FIG. 6 shows an auto-tuning dialog with a list of excluded functions and a list of included functions.

FIG. 6 shows the results of adding a function to the list of functions that are retained in the trace list 602.

Figure 7:
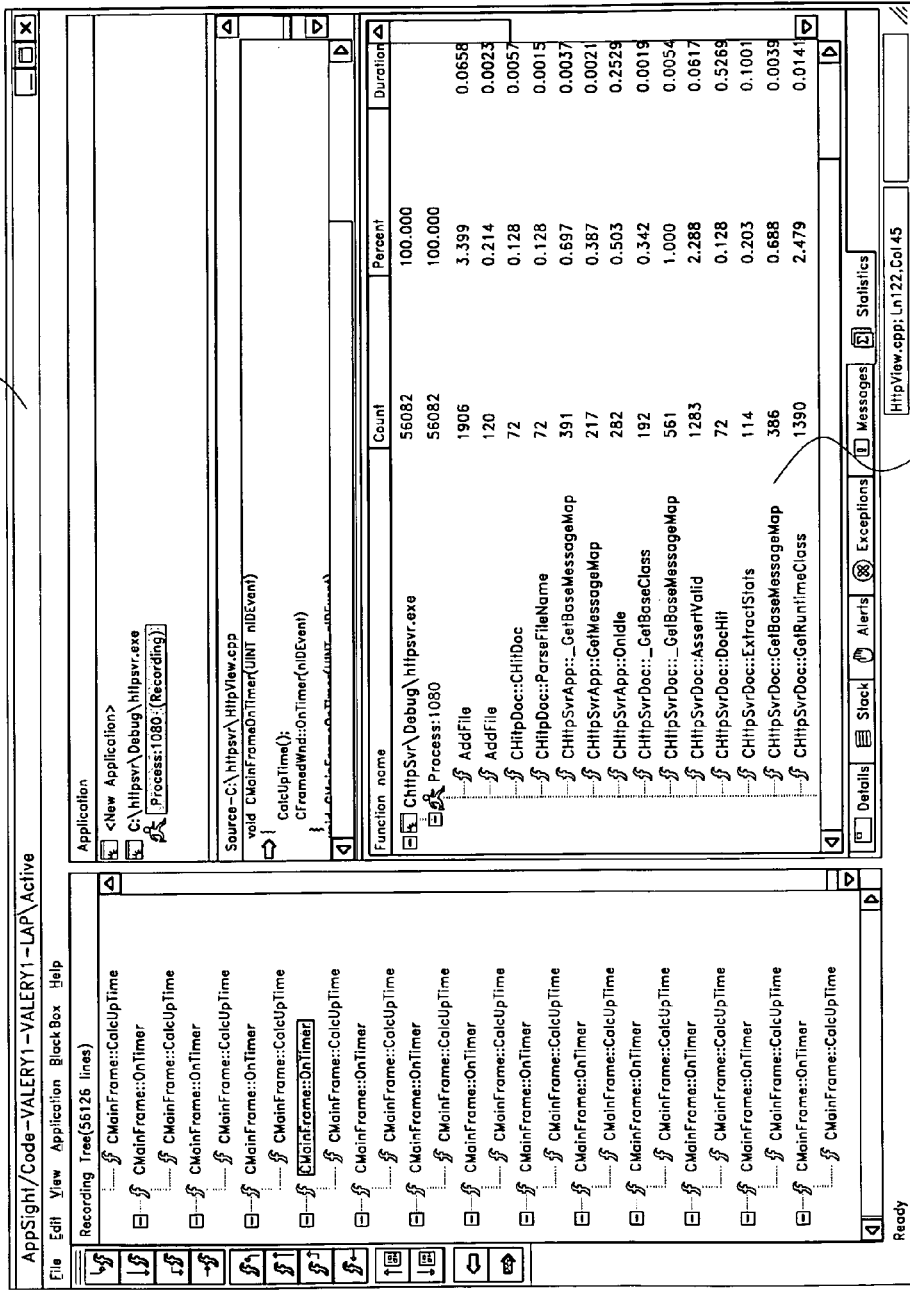
FIG. 7 shows the tracing view of FIG. 3 after tuning.

FIG. 7 shows the tracing window after applying the auto-tuning procedure. The right-lower pane 702 shows the updated list of most frequently executed functions that were traced using the tuned recording profile.

CPU time usage is only one of several performance characteristics. There are a number of other ways to measure useful performance of an application. For example, in the case of HTTP servers it is accepted practice to measure performance by the number of hits-per-second that the server can serve under stressed conditions. Table 1 below shows the reduction in performance penalty achieved by the auto-tuning process. The sample HTTP server httpsrv.exe was stress-tested in 3 modes: 1) without tracing; 2) complete function-level tracing; and 3) auto-tuned tracing. The results of the experiment presented in the table show that auto-tuning allowed to reduce the performance penalty from 75% to 7%.

TABLE 1

| Mode | Performance (hits/sec) | Performance Penalty % |
| --- | --- | --- |
| 1. No tracing | 68.8 | 0% |
| 2. Full function-level tracing | 17.3 | 75% |
| 3. Auto-tuned tracing | 63.9 | 7% |

Although various embodiments have been described above, other embodiments will be apparent to one of ordinary skill in the art based on the above disclosure. For example, the above equations and calculations are provided by way of example and not by way of limitation. One of ordinary skill in the art will recognize that however the performance penalty is specified and calculated, users will typically adjust the desired penalty value in order to keep the performance impact of tracing within acceptable levels. One of ordinary skill in the art will recognize that many methods of specifying the allowable performance penalty and/or computing the performance penalty can be used. Thus, the invention is limited only by the claims that follow.

What is claimed is:

1. A method for tracing comprising:
receiving from a user an initial trace profile listing a first list of runtime events to be traced during execution of a program;
monitoring on one or more processors, via an auto-tuning process, a performance penalty incurred as a result of the tracing of said first list of runtime events during the execution of the program;
determining, via the auto-tuning process, a subset of said first list of runtime events the tracing of which produces the largest impact on said performance penalty to produce a second list of one or more runtime events to not be traced;
removing, via the auto-tuning process, said second list of runtime events from said first list of runtime events;
displaying, in response to the removing, a visual display, wherein the visual display comprises a graphical representation of the second list of runtime events;
receiving from the user a selection from the visual display, wherein the selection comprises one or more runtime events from the second list of runtime events; and
restoring the one or more runtime events contained in the selection from the second list of runtime events to the first list of runtime events.

2. The method of claim 1, further comprising: repeating said monitoring, determining, and removing until said performance penalty falls below a desired level.

3. The method of claim 1, further comprising: returning one or more items on said second list of runtime events to said first list of runtime events until said performance penalty approximates a desired level.

4. The method of claim 1, wherein said performance penalty comprises time taken by a tracing engine compared to time taken by the program being traced.

5. The method of claim 1, wherein said first list of runtime events is specified without recourse to compiler-generated debug information from said program.

6. The method of claim 1, wherein said first list of runtime events is specified without recourse to source code from said program.

7. The method of claim 1, wherein said first list of runtime events is specified using at least a portion of compiler-generated debug information from said program.

8. The method of claim 1, wherein said first list of runtime events is specified using at least a portion of the source code from said program.

9. A method for automated tuning of program execution tracing, the method comprising:
receiving from a user an initial collection of trace points to be included in the program execution tracing;
defining a maximum allowable level for a performance penalty of the program execution tracing;
monitoring on one or more processors, via an auto-tuning process, the performance penalty of the program execution tracing while operating the program execution tracing in accordance with the trace points;
removing, via the auto-tuning process, one or more trace points within the program execution tracing to maintain the monitored performance penalty below the maximum allowable level;
displaying a graphical representation of the one or more removed trace points;
receiving from the user a selection from the graphical representation, wherein the selection comprises a subset of the one or more removed trace points; and
restoring the selected subset of the one or more removed trace points to the trace points within the program execution tracing.

10. The method of claim 9, further comprising initializing the program execution tracing to include all possible trace points.

11. The method of claim 9, further comprising adapting the monitoring to a variable CPU load.

12. The method of claim 9, further comprising increasing the number of trace points within the program execution tracing while maintaining the performance penalty below the maximum allowable level.

13. The method of claim 9, wherein removing one or more trace points comprises disabling at least one trace point.

14. The method of claim 9, wherein the one or more removed trace points comprise the trace points that consume the highest amount of processor time.

15. The method of claim 9, further comprising defining at least one mandatory trace point that is always enabled.

16. A non-transitory computer readable medium storing computer executable instructions which when executed on a processor perform a method for reducing a performance penalty incurred by a program being traced, the method-comprising:
receiving from a user an initial collection of trace points;
defining a maximum allowable level for the performance penalty incurred by the program;
tracing, on one or more processors, the program in accordance with the initial collection of trace points;
assessing, via an auto-tuning process, the performance penalty incurred by the program due to the tracing;
adjusting, via the auto-tuning process, the initial collection of trace points to maintain the assessed performance penalty below the maximum allowable level, wherein the adjusting comprises removing one or more trace points;
displaying a visual display, wherein the visual display comprises a graphical representation of the one or more removed trace points;
receiving from the user a selection from the visual display, wherein the selection comprises one or more of the removed trace points;
restoring the one or more selected trace points to the adjusted initial collection of trace points to create a second collection of trace points; and
tracing, on the one or more processors, the program in accordance with the second collection of trace points.

17. The computer readable medium of claim 16, further comprising defining a frequency at which the performance penalty is assessed.

18. The computer readable medium of claim 16, wherein the initial collection of trace points includes all possible trace points.

19. The computer readable medium of claim 16, wherein adjusting the initial collection of trace points further comprises increasing the number of trace points while maintaining the performance penalty below the maximum allowable level.

20. The computer readable medium of claim 16, wherein removing one or more trace points comprises disabling at least one trace point.

21. The computer readable medium of claim 16, wherein removing one or more trace points comprises disabling the trace points that consume the highest amount of processor time.

22. The computer readable medium of claim 16, further comprising defining certain trace points as mandatory trace points that cannot be disabled.

23. A method for tracing comprising:
specifying an initial trace profile listing a first list of runtime events to be traced during execution of a program;
monitoring on one or more processors, via an auto-tuning process, a performance criteria during the execution of the program while tracing said first list of runtime events;
determining, via the auto-tuning process, a subset of said first list of runtime events the tracing of which produces the largest impact on said performance criteria to produce a second list of one or more runtime events to not be traced;
removing, via the auto-tuning process, said second list of runtime events from said first list of runtime events;
receiving, in response to the removing, a user-selected subset of the second list of runtime events; and
restoring the user-selected subset of the second list of runtime events to the first list of runtime events.

24. The method of claim 23, further comprising: repeating said monitoring, determining, and removing until said performance criteria reaches an acceptable level.

25. The method of claim 23, wherein said performance criteria comprises time taken by a tracing engine.

* * * * *